June 10, 1924.  
C. B. DAWSON ET AL  
1,497,360  
GOLD PLACER MINING SUBMARINE DREDGE  
Filed Aug. 6, 1923  
2 Sheets-Sheet 1
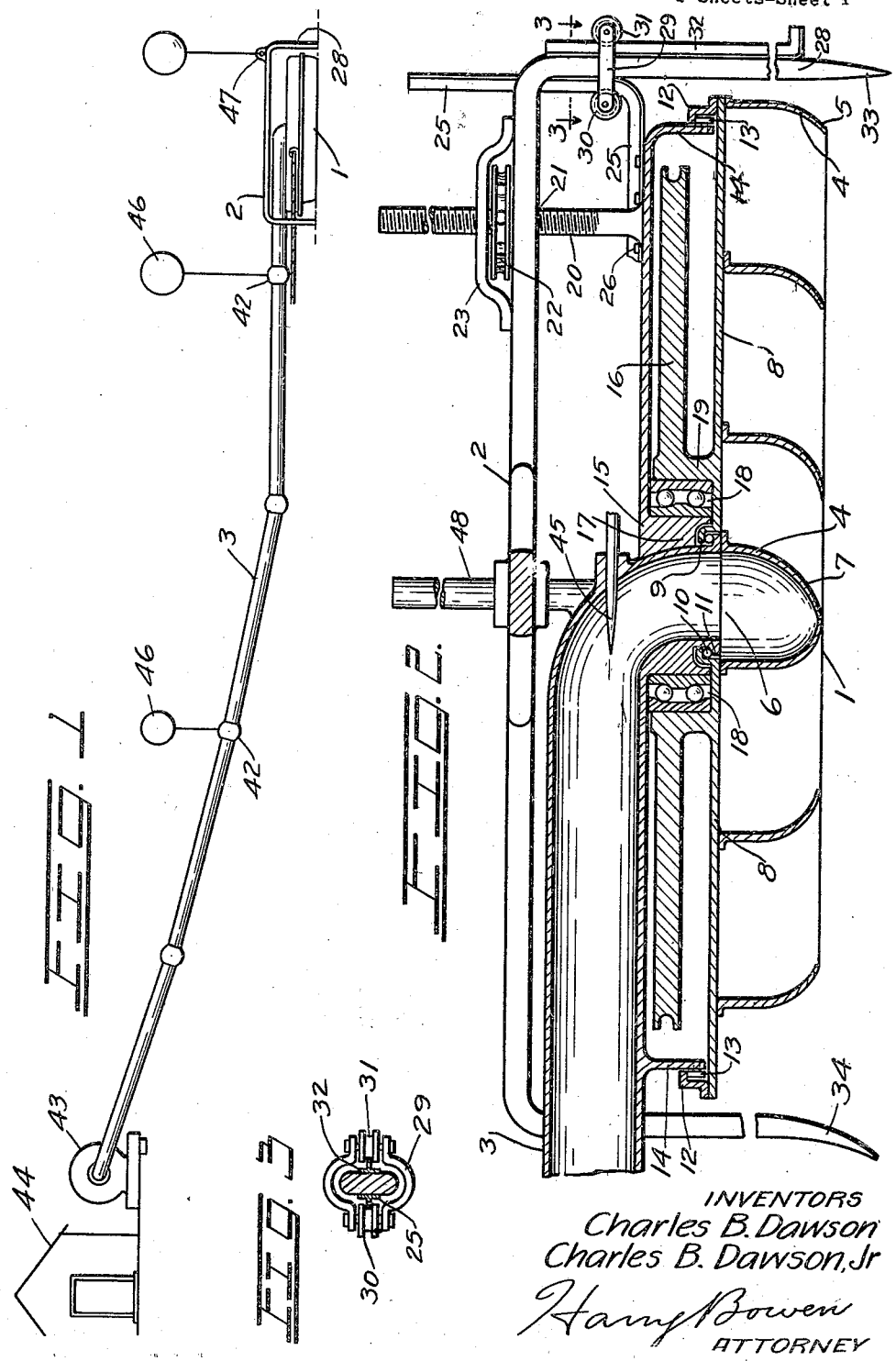
INVENTORS  
*Charles B. Dawson*  
*Charles B. Dawson, Jr*  
*Harry Bowen*  
ATTORNEY

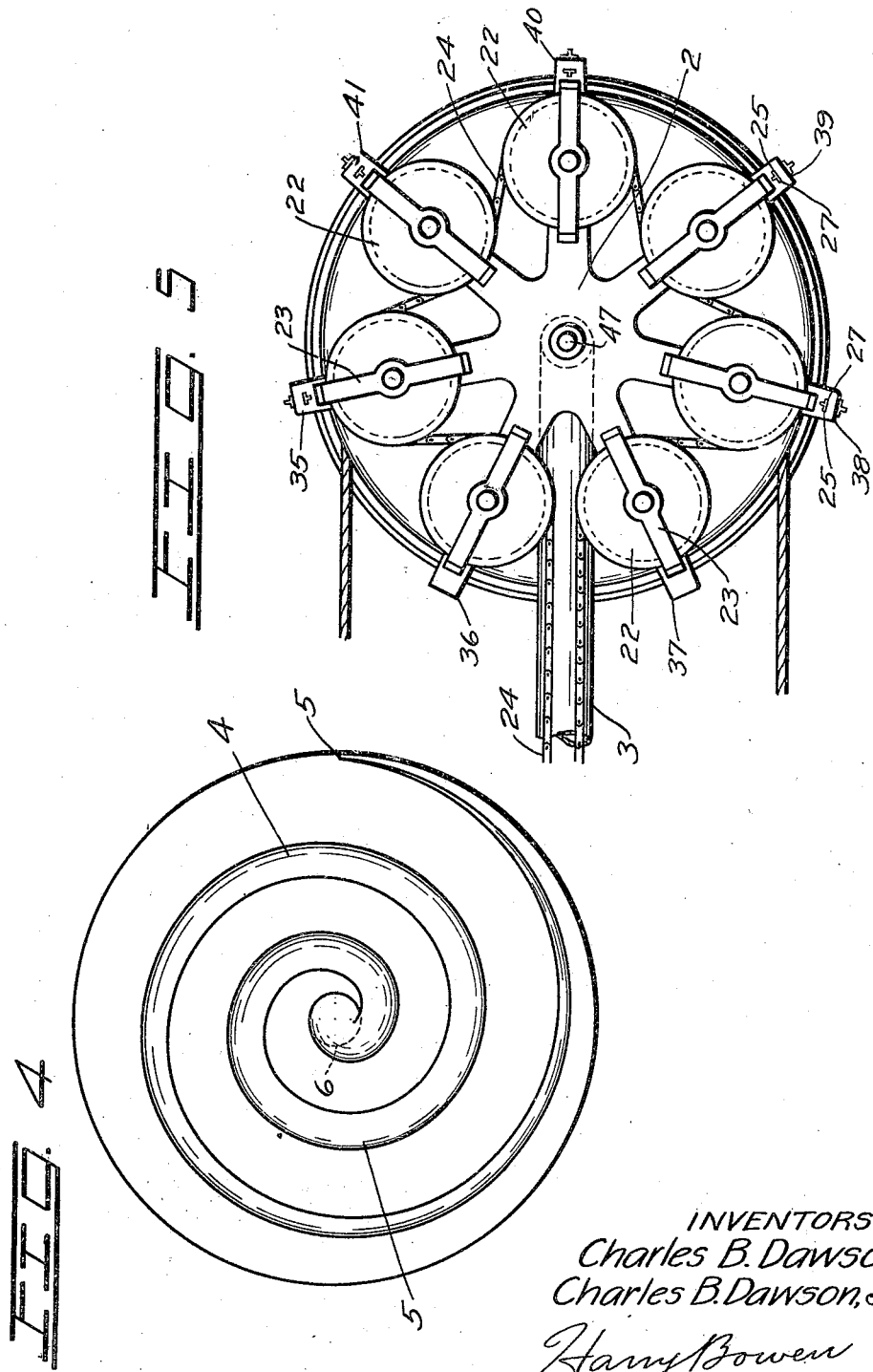

Patented June 10, 1924.

1,497,360

UNITED STATES PATENT OFFICE.

CHARLES B. DAWSON AND CHARLES B. DAWSON, JR., OF SEATTLE, WASHINGTON.

GOLD-PLACER-MINING SUBMARINE DREDGE.

Application filed August 6, 1923. Serial No. 655,951.

*To all whom it may concern:*

Be it known that we, CHARLES B. DAWSON and CHARLES B. DAWSON, Jr., citizens of the United States, residing at Seattle, county of King, and State of Washington, have invented new and useful Improvements in Gold-Placer-Mining Submarine Dredges; and we do hereby declare that the following is a full, clear, and exact specification, such as will enable others skilled in the art to which it appertains to make and use the same.

The invention is an adjustable device for scooping up material by a combination of both centripetal and centrifugal motion and conveying it from the bottom of the ocean to the shore.

An object of the invention is to provide a centripetal spiral scoope with vertically movable guides at its outer edge.

Another object of the invention is to provide rollers on the lower edge of the skirt of the sheave housing, for holding the centripetal spiral plate.

And a further object of the invention is to provide sprockets for raising and lowering the dredge, which are arranged so that the chain for driving them may be placed on either side, and which are mounted on right and left hand screws.

With these ends in view the invention embodies a spiral scraper attached to a plate having a sheave on its upper side and being supported on rollers on the lower edge of a skirt on a circular housing, the veins of the spiral leading to an opening in the center over which is a pipe that leads from the scraper to a pump on the shore. The circular casing with the rollers on its skirt, is supported by screws passing through the arms of a spider and is provided with guides that hold it to the legs of the spider. The screws that support the circular casing from the spider are provided with sprockets that are operated by a chain from the shore, and are so arranged that as the sprockets are rotated, the scraper will move upward or downward. Some of the legs of the spider are curved slightly toward the shore to insure their holding in the surface.

Other features and advantages of the invention will appear from the following description taken in connection with the drawings, wherein:

Figure 1 is a view showing the general arrangement.

Figure 2 is a cross section through the spiral scraper and its supports.

Figure 3 is a sectional plan on line 3—3 of Figure 2.

Figure 4 is a bottom view of the spiral scraper.

Figure 5 is a plan showing the scraper supports.

In the drawings we have shown our device as it would be constructed, wherein numeral 1 indicates the scraper, numeral 2 the spider for supporting the scraper, and numeral 3 the pipe leading from the scraper to the shore.

The scraper may be constructed as shown in Figures 2 and 4, with a spiral vein 4 extending downward from its under side and extending from a point 5 at the outside of the scraper to an opening 6 at the center. The lower edge 7 of the vein is curved slightly inward at the outer edge, and this curve increases as it reaches the center, thus forming a scoop so that the material will be more readily picked up, and so that the centripetal motion of the spiral will more readily cause the material to be conveyed toward the center and up through the opening 6 into the pipe 3. The plate holding the scraper is made of a flat circular plate 8, which is supported at the center by flanges 9, bearing upon ball bearings 10 that are supported on a flange 11, and at the outer edge is a continuous clip 12 that rests upon rollers 13 on the lower edge of the skirt 14 of a cylindrical shaped cover 15, that encloses a sheave 16 rigidly fastened on top of the scraper plate 8. The cover 15 has a hub 17 at its center upon which a radial ball bearing 18 is mounted, and upon this ball bearing the hub 19 of the sheave 16 is fixedly mounted. The cover 15 has studs 20 projecting upward from it, which pass through openings in the arms 21 of the spider 2, and on these studs are sprockets 22, which are held by plates 23 and which are rotated by a chain 24, so that as they are turned in one direction they will lower the scraper and as they are turned in the opposite direction they will raise the scraper.

T-shaped bars 25, which are bent in the shape of an angle, may be fastened to the top of the cover 15, by bolts 26, and may extend upward through openings 27 in the arms 21, so that as the scraper is moved upward or downward these bars will bear against the vertical extension legs 28 of the arms 21 and hold the scraper laterally. These bars may be held against the extensions 28 by frames 29, which have rollers 30 in one end that engage a T-shaped bar 25, and also rollers 31 in the opposite end, which engage other T-shaped bars 32, the lower ends of which are bent outward on the outer surfaces of the extension legs 28. The extensions 28 may be pointed as shown at the point 33, on one side of the scraper, and pointed and curved slightly outward as shown at the point 34 on the opposite side of the scraper or on the extensions indicated by the numerals 35, 36, 37 and 38, as shown in Figure 5, so that as the force of the cable operating the scraper pulls the device the points that are curved outward will dig into the soil and hold it. The frames 29, which prevent the cable pulling the scraper away from the legs may only be placed on the outer side of the device or on the extensions indicated by the numerals 35, 38, 39, 40 and 41.

The pipe 3 is curved directly outward from the opening 6 and may be constructed with flexible joints 42, so that it may be bent in any desired direction. This pipe will lead to a pump 43 which may be placed at any suitable position on the shore, and adjacent this pump may be a building 44 in which the machinery for operating the device may be placed. It will be seen that the scraper may be rotated by a cable being placed around the sheave 16, and extending through the water to the machinery on the shore. A nozzle 45 may be inserted in the bend of the pipe 3, through which air under pressure may be forced to assist in forcing the material up the pipe if necessary. Buoys 46 may be attached to eyes 47 on the spider 2 or attached to the joints 42, to locate the scraper and pipe.

A shaft 48 may project upward from the bend in the pipe 3, through the spider 2 in order to pivotally hold the center of the housing and scraper.

It will be understood that changes may be made in the construction without departing from the spirit of the invention. One of which changes may be in the use of bars other than T-shaped bars for the rollers 30 and 31 to operate upon. Another change may be in the pitch of the spiral veins on the scraper, and still another may be in the means for attaching the scraper to the cover.

The construction will be readily understood from the foregoing description. To use the device it may be assembled as shown, with the operating machinery installed in a suitable building on the shore and the dredge or scraper located by scows and lowered at any desired positions. The spiral scraper may be adjusted by the chain 24, so that its lower edge will engage the material upon which the device is placed. The scraper may then be rotated by the cable as hereinbefore described, and as it scoops up the material, the working surface may be lowered by the chain 24, as hereinbefore described. It will be seen that the centripetal motion of the scraper will force the material up through the pipe 3, and if this force is not found to be sufficient to carry the material to the shore, it may be assisted by the pump 43 and nozzle 45.

Having thus fully described the invention, what we claim as new and desire to secure by Letters Patent, is:

1. A spiral scraper having one vein with its lower edge curved toward the center, extending from the outer edge to an opening in the center, a pipe leading from the opening in the center to a pump on the shore, said pipe being provided with a nozzle for assisting the flow of the material, a sheave being attached to the plate carrying spirals and enclosed by a cover attached to the scraper; a spider for supporting the cover and scraper; means for moving the cover and scraper in relation to the spider; means for slidably holding the cover and scraper to the legs of the spider; and a suitable means for rotating the scraper from the shore.

2. A spiral scraper having scoop shaped blades that lead from its outer edge toward an opening in its center, which are formed so that as the scraper is rotated the centripetal motion will force material engaged by the blades, up through the opening, a pipe having flexible joints in it leading from the opening to a remote point, a sheave on the scraper over which a cable may pass for rotating the scraper from a remote point; a cover for the sheave upon which the scraper may be rotatably mounted; a spider with pointed legs projecting downward, some of which are curved outward; means for raising and lowering the cover and scraper, which may be operated from a remote point and by which the cover and scraper may be supported from the spider; bars extending from the cover, which engage the legs of the spider; frames having rollers in them for slidably holding the bars to the legs, and buoys for locating the device.

3. A spiral scraper having a sheave by which it may be operated from a remote point; a pipe leading from an opening in the center of the scraper to a remote point; and a frame for adjustably supporting the scraper, said adjustable means being constructed so that it may be operated from a remote point, said supporting means being provided with lateral guides, having frames with rollers in them for holding the guides, and said supporting means having pointed legs, some of which curve outward.

CHARLES B. DAWSON.
CHARLES B. DAWSON, Jr.